United States Patent

Darrow

[15] 3,651,661
[45] Mar. 28, 1972

[54] COMPOSITE SHAFT WITH INTEGRAL END FLANGE

[72] Inventor: Donald C. Darrow, Fairfield, Conn.
[73] Assignee: United Aircraft Corporation, East Hartford, Conn.
[22] Filed: Feb. 2, 1970
[21] Appl. No.: 7,722

[52] U.S. Cl. ...................................64/1, 138/130, 138/144, 138/149
[51] Int. Cl. .......................................................F16c 1/00
[58] Field of Search.................138/130, 141, 144, 149, 153, 138/172; 285/405; 287/107, 130; 244/17.11, 60; 64/1, 2, 10; 74/15, 69; 161/47, 57, 172, 159, 160

[56] References Cited

UNITED STATES PATENTS

| 2,911,236 | 11/1959 | Thibault | 138/130 |
| 3,296,826 | 1/1967 | Van de Graaff | 64/1 |
| 3,429,758 | 2/1969 | Young | 138/144 |
| 3,430,661 | 3/1969 | Sabine | 138/144 |
| 3,481,156 | 12/1969 | Csipkes | 64/2 |
| 3,553,978 | 1/1971 | Williams | 64/1 |

*Primary Examiner*—Robert F. Burnett
*Assistant Examiner*—Linda C. Koeckert
*Attorney*—Vernon F. Hauschild

[57] ABSTRACT

A composite shaft with an integral end flange fabricated of a plurality of layers of high modulus fibers of selected fiber orientation positioned between and bonded to protective outer and inner layers as required and to one another such that each layer extends the full length of the shaft and the flange. The shaft layers may be of sandwich construction and may be asymmetric and the flange periphery may include doublers of bearing material.

53 Claims, 11 Drawing Figures

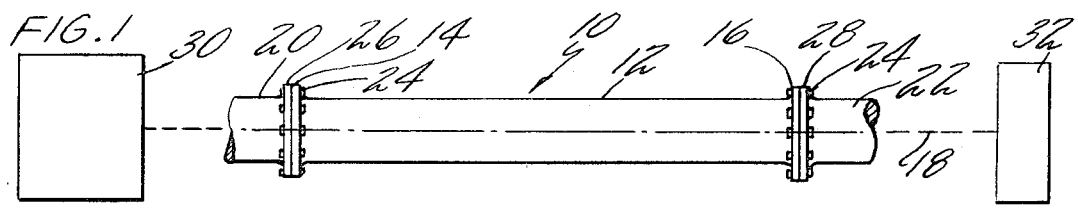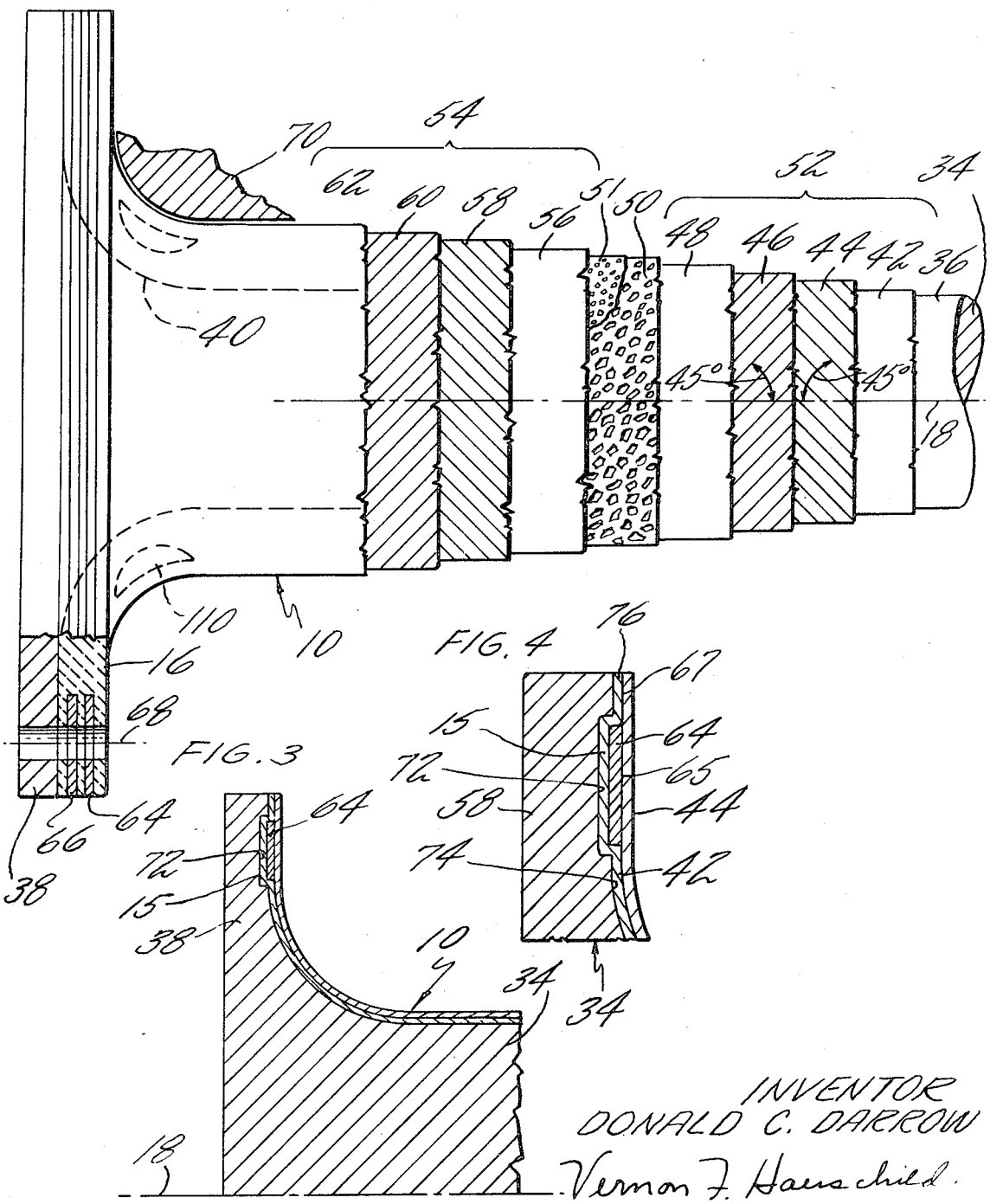

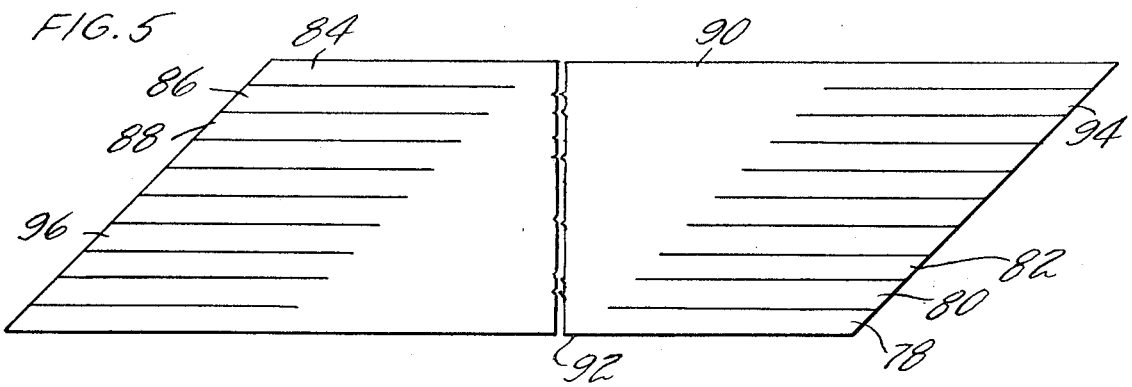
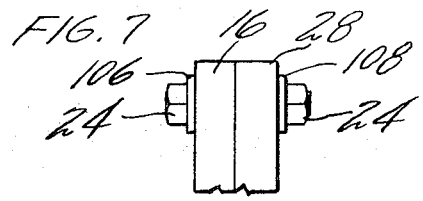
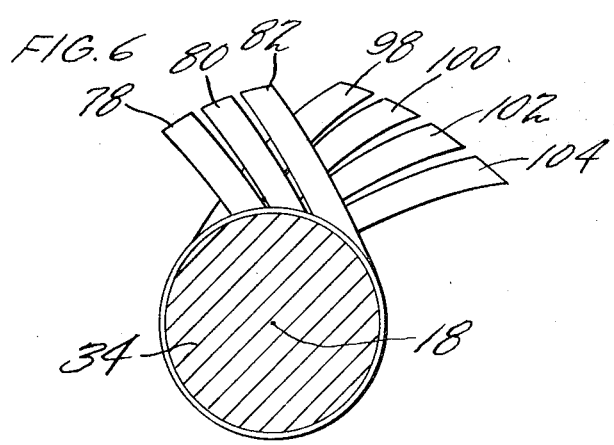
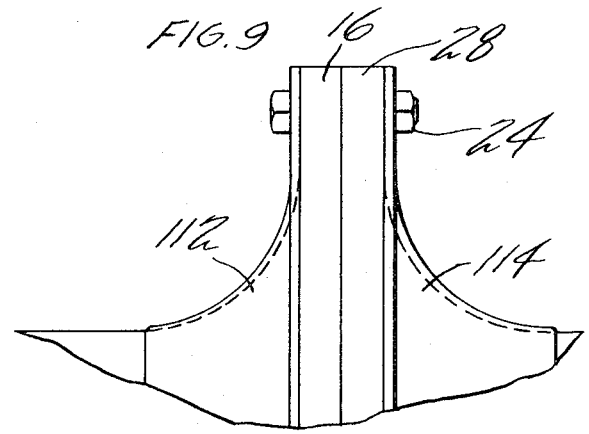
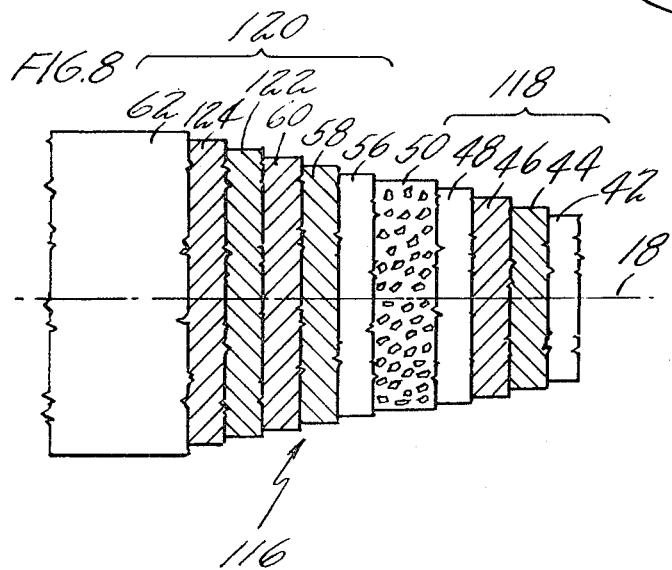

COMPOSITE SHAFT WITH INTEGRAL END FLANGE

CROSS-REFERENCE TO RELATED APPLICATIONS

There are no related copending applications.

BACKGROUND OF THE INVENTION

1. Field of Invention

This invention relates to hollow shafts, ducts or pipes with integral end flanges and particularly to such shafts which must be connected end-on-end with similar shafts to extend for substantial distances and mounted to rotate or oscillate about the shaft axis so that power may be driven therethrough, for example, to drive the tail rotor of a helicopter from a power plant located a substantial distance therefrom.

2. Description of the Prior Art

In the remote drive shaft art and related arts, metal shafts have been used buy they are found to be expensive to machine, heavy in weight and require heavy support bearings which are objectionable in many applications, such as flight applications. While such shafts have been made of layers of fibers, such as fiberglass, bonded together as in Medney U.S. Pat. No. 3,336,176, connecting such shafts together present problems because bonding the shafts together prevents their separation at a later time when required, and such fiber reinforced plastic has poor bearing strength and therefore is not susceptible to successful bolting of abutting end flanges.

While metallic end flanges have been either bonded or riveted to reinforce plastic pipe, a fail safe bond has not been achieved and there are no nondestructive tests to test such bonds and, further, it has been found that the riveting process causes stress concentrations which are potential sites of failure.

Plastic flanges have been bonded to plastic reinforced piping as in Saville U.S. Pat. No. 2,703,109 but this construction provides a structural discontinuity which is undesirable in rotating shaft constructions which must transmit torque.

SUMMARY OF THE INVENTION

A primary object of the present invention is to provide a composite shaft with integral end flanges which is capable of being mounted for rotation and to connect to adjoining mechanisms to transmit torque therebetween.

In accordance with the present invention, a composite shaft is provided with integral end connecting flanges which includes a plurality of layers of high modulus fibers positioned between and adhesively bonded to protective layers of plastic impregnated fiberglass cloth and wherein the orientation of the high modulus fiber is of selected angularity with respect to the shaft axis to produce optimum torque transmitting qualities to the shaft and wherein the fibers extend the full length of the shaft and end flanges.

The invention permits the use of lightweight composite material which can be integrally bonded together to form both shaft and end connecting flanges so as to produce a structure which requires no machining and which is substantially lighter than the metals which are conventionally used for such shafting.

In accordance with the present invention, at least one layer of protective material, such as plastic reinforced fiberglass, is laid upon a selectively shaped male mandrel with a plurality of layers of high modulus fiber material positioned therebetween and bonded thereto to form an integral unit and in which the fibers of the high modulus fiber material are selectively oriented with respect to the shaft or mandrel axis to produce maximum torque transmitting qualities and so that high modulus fiber layers have their fibers oriented in different directions to provide a construction having maximum load carrying capability and the capability of transmitting torque when the shaft is rotated in both a clockwise and a counterclockwise direction.

In accordance with the present invention, the shaft and its end fittings are one piece and the layers or plies of material which are built up and bonded to one another to form the shaft and its end flanges extends the full length of the shaft and the flanges.

In accordance with a further aspect of the present invention, good bearing strength materials are embedded in the flange periphery to improve its bolt holding qualities.

In accordance with still a further aspect of the present invention, such a composite shaft can be built up so as to be of sandwich construction wherein the plurality of layers within the core member and the plurality of layers outside of the core member can be equal to produce a balanced sandwich construction or, the shaft can be asymmetric, wherein there are a greater plurality of torque carrying layers outside of the core member than there are inside of the core member so as to produce a shaft with maximum strength area at a distance farthest from the shaft axis of rotation and thereby produce the shaft with maximum torque transmitting capability.

In accordance with still a further aspect of the present invention, the aforementioned bearing strength material which was inserted in the flange periphery is so embedded that the high modulus fibers can lay flat thereagainst and are not required to be bent sharply in lay-up.

It is a further aspect of the present invention to produce such a shaft and integral flange which has both an inner and outer protective layer of plastic impregnated fiberglass cloth.

It is still a further aspect of the present invention to produce such a shaft in which the ends of the layers are split so as to produce a plurality of finger members which can be readily flared or flowered out between the shaft and the flange as required to produce a construction with a smooth transition region between shaft and flange.

In accordance with a further aspect of the present invention, the integral end flange of the shaft comprises a plurality of thin cup members which are sandwiched alternately with at least one layer of high modulus fiber material and which are shaped to be solid at their outer periphery, which matches the flange outer periphery, and which are curved at their inner ends to assume the shape of the transition section between the shaft and the flange. The inner ends are cup members or shaped as fingers so that they taper in both a shaft circumferential direction and in thickness. The fingers of adjacent cup members terminate in the spaced planes along the shaft axis and are circumferentially displaced with respect to one another.

In accordance with a still further aspect of the present invention, such a composite shaft with integral end flanges is produced utilizing a single lay-up of layers and a single curing process thereof

BRIEF DESCRIPTION OF THE DRAWINGS

FIG. 1 is a showing of a composite shaft with integral end fittings or flanges connected to corresponding connecting members of similar shafts or other related drive material so that the composite shaft is capable of transmitting torque therebetween. FIG. 2 is a showing of the build up of my composite shaft with integral end flange and selectively broken away to illustrate the order of ply lay-up and the orientation of the laid-up fibers on the mandrel.

FIG. 3 is a cross-sectional showing through a male mandrel showing the lay-up of layers of my composite shaft and flange to illustrate the method of embedding one type of doubler or bearing support member therein.

FIG. 4 is an enlarge showing of a part of the FIG. 3 construction to permit a better description of the lay-up procedure followed in embedding the support member.

FIG. 5 is a showing of a single layer or ply of lay-up material split at its ends to produce a plurality of fingers.

FIG. 6 is a showing of the spreading or the flowering of the fingers of FIG. 5 as they project from adjacent layers on the male mandrel during ply lay-up so as to form a smooth transition between the shaft and its integral end flange.

FIG. 7 is an enlarged exterior showing of two end flanges of composite shafts joined to illustrate doublers or support members used externally thereof.

FIG. 8 is a showing of the layer buildup of my shaft to produce an asymmetric shaft having optimum torque transmitting capabilities.

FIG. 9 shows a modified external support for shaft flanges and shaft-to-flange transition sections.

DESCRIPTION OF THE PREFERRED EMBODIMENT

Figure 10:
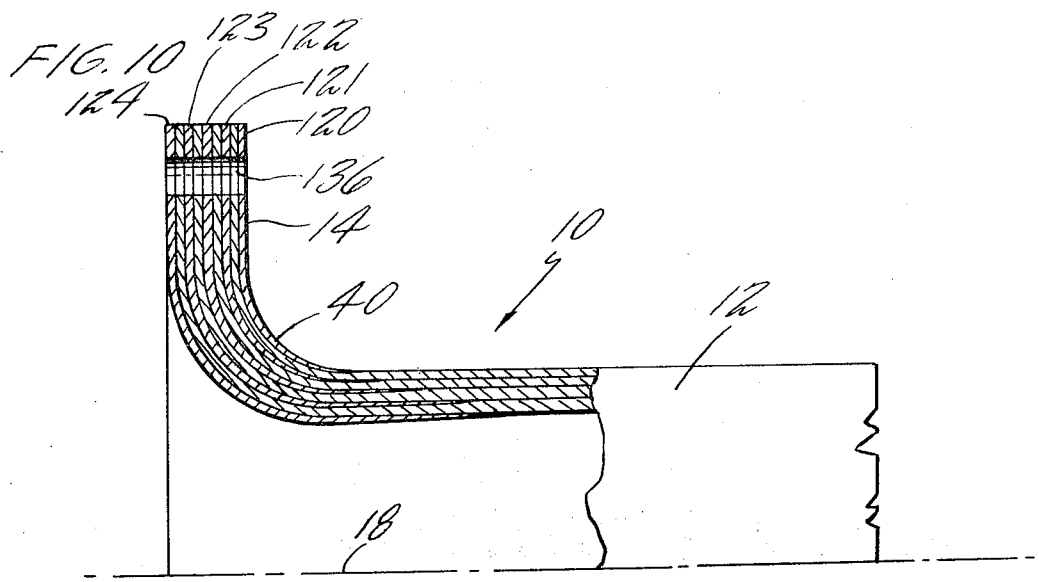
FIGS. 10 and 11 illustrate another form of flange support mechanism which would be used as an alternative to the construction shown in FIGS. 3 and 4.

Referring to FIG. 1 we see my composite shaft with integral end fittings 10, which comprises shaft section 12 and circumferential flange end fittings 14 and 16, all of which are circular cross section preferably and concentric about shaft, pipe or duct axis 18. Bearings and alignment coupling are placed between the flanges of different shaft sections to support the shaft for rotation or oscillation around axis 18. Shaft member 10 is connected in driving relation to similar shafts 20 and 22 at opposite ends thereof and connected thereto by bolt members 24 which extend through and connect adjacent flanges 14 and 26 as well as 16 and 28 in conventional fashion. Because of this interconnection between members 20, 10 and 22, all of which are mounted for rotation, or at least rotary oscillation, about axis 18, torque from some power source such as engine 30 may be transmitted therethrough to some driven member such as propeller, rotor, reduction gear or the like 32.

Shaft member 10 is a one-piece, integral unit made up of a plurality of bonded layers or plies, each of which extends continuously throughout the length of shaft member 10, including the flange portion and the shaft portion thereof.

The layer buildup is shown in greater particularity in FIG. 2 to which reference will now be made. Male die or mandrel 34 is fabricated to have the precise desired shape of shaft member 10 including its integral end fittings. Mandrel 34 accordingly includes shaft section 36 and flange section 38, which are smoothly joined by transition section 40. Shaft member 10 comprises an inner protective layer 42 which is preferably fiberglass cloth reinforced plastic and which is the first layer layed onto mandrel 34. When inner layer 42 is completely smoothly laid-up on mandrel 34, throughout shaft section 36, transition section 40, and end flange section 38 thereof, the first intermediate layer 44 of high modulus, high tensile strength fiber, such as boron fiber, is laid onto the mandrel therearound with the parallel fibers thereof selectively oriented as shown to form a selective angle with axis 18, so as to produce optimum torque transmitting capabilities of shaft 10. As shown in FIG. 2, about 45° is generally considered to be an appropriate angle. Optimally, the fiber orientation is selected so that the fibers are subjected to either compressive or tensile forces only as a result of torsional loading of the shaft. We may, for example, place some load-carrying fiber material at an angle of +45° with the shaft axis 18 to withstand torsional forces and other fiber material at an angle of −45° with the shaft axis 18 to withstand compressive forces, thus permitting the shaft to optimally transmit torque. In long shafts with relatively small diameters, longitudinal flexing occurs and therefore it may be desired in such a shaft to orient some of the fibers as ±30° and even 0° with the shaft axis 18 to increase shaft flexural stability.

Second intermediate layer 46 of high modulus fiber material, such as boron, is laid-up over layer 44 such that its parallel fibers are selectively oriented to form an angle with respect to axis 18 of about equal magnitude and opposite direction therefrom with respect to the fibers of layer 44, again shown to be about 45° as FIG. 2. Layer 48, which is preferably plastic impregnated fiberglass is then layed upon layer 46 and this could well constitute the total shaft wall for a thin walled shaft. However, it is preferable to have the shaft of sandwich construction to include sandwich layer 50 of either plastic foam or honeycomb positioned between inner layer plurality 52, which comprises layers 42, 44, 46 It will be noted that fiberglass reinforced plastic layer 62 accordingly serves as an outer protective layer for the high modulus fiber layers 60 and 58 therebeneath for their protection from rupture due to the shaft receiving a striking blow.

If core 50 is honeycomb, it may be advisable to position and bond a small apertured sleeve 51 therearound so that the high modulus fibers do not sag in catenary fashion into the honeycomb cells because these fibers are strongest when straight. Sleeve 51 should be selected to be compatible with core 50 from a thermal expansion and other standpoints.

It will be noted that each of layers 42–62 extend for the full length of the shaft and flange. In certain installations, the inner and outer protective layers, which normally prevent erosion and foreign particle damage, may be used at selected sites only.

In a manner to be described hereinafter, doublers or bearing support members, one or more, such as 64 and 66 are located in the periphery of flange 16 and will have holes drilled therethrough about bolt hole axis 68 after curing.

With the various layers of shaft member 10 laid up as shown in FIG. 2, and it should be noted that shaft 10 includes a similar opposite flanged end to the one shown, mandrel or die 34 may then be placed in a female die or mandrel 70 shaped to the exterior of shaft 10 or may position within inflatable bags which may be inflated to the shape of die 70 and then cured in conventional manner in an autoclave.

Doubler or support member 64 and its method of inclusion in the layer buildup is better shown in FIGS. 3 and 4. The flange portion 38 of mandrel 34 includes a recess 72, which is slightly larger than and the same shape as doubler 64. Doubler 64, and hence recess 72 can be a circumferential flat ring concentric about section axis 18, can be individual discs or can be portions of a ring, as required. Since boron fibers are strong in tensile strength but are subject to fracture when caused to be bent around sharp corners, the preferred construction, thus shown in FIG. 4 is to have one or more layers of plastic impregnated fiberglass cloth, such as 42 pass along surface 74 of die 34 and to extend into and closely follow the contour of recess 72 as shown and to emerge therefrom once again onto surface 74 at its outer periphery 76. Aperture, recess or indentation 72 is of selected size so that with layer 42 of fiberglass layed thereinto, when doubler 64 is positioned thereon, top surface 65 of doubler 64 and top surface 67 of layer 42 lie in a common plane so that one or more layers of high modulus fiber, such as 44, can extend flat the reacross so that no bends are imparted thereto to avoid any weakening thereof.

Since it is an important teaching of my invention that shaft member 10 and its circumferential end flanges 14 and 16 be an integral unit, it is desirable to have the various layers of high modulus fiber material and the plastic impregnated fiber cloth material extend through the transition section between the shaft and the flange in smooth fashion and to lay flat against the male mold 34 during the lay-up process. It has been found that this can be best accomplished if the ends of the various layers are cut as shown in FIG. 5 to produce a plurality of fingers, such as 78, 80, and 82 at one end and 84, 86, and 88 at the opposite end, all of which are cut so as to be parallel to one another and parallel to the outer surfaces 90 and 92 of the layer involved and to be cut at their ends along angular surfaces 94 and 96 so that, in fact, a parallelogram is formed. With each layer so fabricated, as best shown in FIG. 6, when two or more consecutive layers are placed upon mandrel 34, a first set of such fingers 78, 80 and 82 may smoothly flare or flower out in transition between shaft section 36 of die 34 and flange section 38 thereof so as to lie flatly and smoothly along transition section 40 thereof. Similar fingers 98, 100, 102 and 104 of the next layer of material flare or flower out similarly as shown in FIG. 6 but in opposite orientation to cooperate with similar fingers on all other layers 42–62 to form a smoother transition section 40 (FIG. 2) between shaft section 12 and flange section 14 and 16 of shaft member 10.

While FIGS. 2 and 4 show that one or more doublers of good bearing material, such as metal, can be embedded in the periphery of the circumferential end flanges, such as 16, in practice, it might be well to also use external doublers 106 and 108 of corresponding shape (FIG. 7) so that maximum bearing strength is provided at flange connecting bolt 24. Selectively shaped doublers, such as 110 (FIG. 2) may be positioned in the shaft-to-flange transition portion 40 of shaft member 10 and selectively shaped external doublers 112 and 114 could be used for both flange and transition section support as best shown in FIG. 9.

While we have previously discussed thin walled tubes of the type which would be produced by fabricating a composite tube or shaft of layers 42, 44, 46 and 48 of FIG. 2 only or the balanced sandwich construction shown in FIG. 2, it may be desirable under some circumstances to make an asymmetric shaft construction of the type shown in FIG. 8. It has been found that the thin wall shaft has torsional buckling instability when carrying high torque loading and that the balanced sandwich construction is inefficient with half of the torque carrying members placed in a low torque region near the shaft inner diameter. The asymmetric shaft 116 shown in FIG. 8 includes a thin inner stabilizing tube or face 118 which includes layers 42, 44, 46 and 48 as in FIG. 2 a thin core 50 of rigid foam or honeycomb and a thick outer face 120, of substantially greater wall thickness than inner face 118 and including layers 56, 58, 60 and 62 of FIG. 2 plus two or more additional intermediate layers of high modulus fiber 122 and 124.

The laminate cross plies are so oriented that the outer face ply is loaded principally in a tension mode. The inner compression plies are therefore restrained from buckling so that shaft 116 can be torque loaded to a higher level.

In the FIG. 8 construction preferably the plies 48 and 56 which are bonded to the core have the same fiber orientation in order that torsional shear in the core may be reduced.

Figure 11:
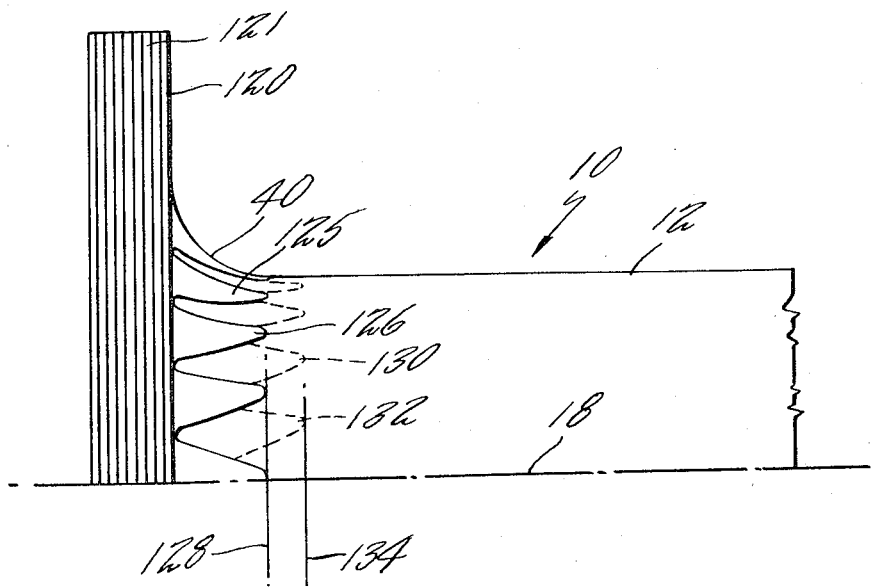

FIGS. 10 and 11 illustrate an alternative form of flange reinforcement to that previously described in connection with FIGS. 3 and 4. This construction includes a plurality of cupped shaped members, such as members 120–124 which are shaped to be substantially flat at their outer periphery so as to assume the shape and the outer periphery of flange section 14. The cup shaped members gradually bend asymptotically toward shaft axis 18 as they extend through transition section 40 into shaft section 12. Each of the cup members terminates at the inner end in a plurality of spaced circumferential fingers, such as fingers 125 and 126 of cup member 120 which terminate substantially in plane 128 perpendicular to axis 18. Fingers 125 and 126 taper both circumferentially and in wall thickness. The finger, such as 130 and 132 of cup member 121 terminate substantially in plane 134 which is axially spaced from plane 128 and substantially parallel thereto. It will be noted that the fingers 130 and 132 and cup member 121 are circumferentially spaced from and positioned between the fingers 125 and 126 so that a non-abrupt interconnection is achieved between shaft section 12 and flanges section 14 and so that full support is given to both flange section 14 and intermediate section 40. Bolt holes 136 may be drilled through flange 14 to permit attachment between two adjacent mechanisms or other conventionally connected means may be utilized.

There have thus been described embodiments of my invention. I wish it to be understood, however, that I do not desire to be limited to the exact details of construction shown and described, for obvious modifications will occur to a person skilled in the art.

What I claim as new and desire to secure by Letters Patent of the United States is:

1. A composite shaft member having an integral end flange with both the shaft section and the flange section concentric about an axis and including a plurality of layers of material positioned concentrically within one another and extending the full length of the shaft portion and the flange portion and being bonded together to form the shaft and flange and including:
   a. an inner layer of fiberglass reinforced plastic,
   b. an outer layer of fiberglass reinforced plastic,
   c. a plurality of intermediate layers of high modulus fibers positioned concentrically between said inner and outer layers and bonded thereto and to each other and each including a plurality of high modulus fibers extending in parallel relationship to one another and forming a selected angle with the shaft axis and wherein the fibers of adjacent intermediate layers are oriented in different selected angular relationship with respect to the shaft axis.

2. Apparatus according to claim 1 and including a high bearing strength support member embedded in the periphery of the flange section to add bearing strength thereto.

3. Apparatus according to claim 1 wherein said high modulus fibers are boron filaments.

4. Apparatus according to claim 2 wherein said support member is a circumferentially extending ring.

5. Apparatus according to claim 4 wherein said circumferentially extending ring is metal.

6. Apparatus according to claim 1 wherein the fibers of a first of said intermediate layers forms a 45° angle with the shaft axis and wherein the fibers of a second of said intermediate layers forms a 45° angle with the shaft axis and a 90° angle with the fibers of the first intermediate layer.

7. Apparatus according to claim 2 and including a high bearing strength support member abutting the periphery of said flange section in parallel relationship to said embedded high bearing strength support member.

8. Apparatus according to claim 7 wherein a smooth transition section is positioned between and connects said shaft section and said flange section of said composite shaft member and further wherein said external support member extends from the periphery of said flange section inwardly across said transition section so as to provide bearing support to both said flange section and said transition section.

9. Apparatus according to claim 2 wherein said intermediate layers extend flat across said support member wherein either said inner layer or said outer layer is formed to the shape of the support member.

10. Apparatus according to claim 1 wherein each of said layers includes a plurality of finger members at the flange end thereof which flare out to effect a smooth transition between the shaft section and the flange section.

11. A one-piece, composite shaft with at least one integral end flange and with a smooth transition section extending between the shaft section and the flange section and formed of a plurality of bonded layers positioned concentrically about the shaft axis and each extending throughout the shaft and flange and cooperating to form a sandwiched construction wall including:
   a. an inner plurality of layers having:
      1. an inner most protective layer,
      2. an outer most protective layer,
      3. a plurality of intermediate layers of high modulus fibers positioned between said protective layers and bonded thereto and to each other and each having a series of parallel high-modulus fibers selectively oriented with respect to the shaft axis so that the fibers of different intermediate layers extend in different directions,
   b. a sandwich layer of honeycomb material enveloping and bonded to said inner plurality of layers,
   c. an outer plurality of layers enveloping said sandwich layer and including:
      1. an inner protective layer enveloping and bonded to said sandwich layer,
      2. an outer protective layer forming the outer skin,
      3. a plurality of intermediate layers of high modulus fibers positioned between said protective layers and bonded thereto and to each other and each having a series of parallel high modulus fibers selectively oriented with respect to the shaft axis so that the fibers of different intermediate layers extend in different directions.

12. Apparatus according to claim 11 wherein said intermediate layers of said inner and outer pluralities are oriented at an angle of about 45° with the shaft axis.

13. Apparatus according to claim 11 wherein said high modulus fibers of said intermediate layer pluralities are boron filaments.

14. Apparatus according to claim 11 wherein said sandwich layer is made of plastic foam.

15. Apparatus according to claim 11 and including a high bearing strength support member embedded in the periphery of the flange section to add bearing strength thereto.

16. Apparatus according to claim 15 wherein said support member is a circumferentially extended ring.

17. Apparatus according to claim 11 wherein said intermediate layers of said inner plurality and said intermediate layers of said outer plurality are oriented at different angles with respect to said shaft axis.

18. Apparatus according to claim 11 wherein said shaft is asymmetric and wherein said outer plurality of layers includes a greater number of intermediate layers than the inner plurality of layers.

19. Apparatus according to claim 11 wherein each of said layers includes a plurality of finger members adjacent the end flange which flare out smoothly through said transition section and said flange section.

20. Apparatus according to claim 16 wherein said circumferentially extending ring is metal.

21. Apparatus according to claim 16 and including a high bearing strength support member abutting the periphery of said flange section in parallel relationship to said embedded high bearing strength support member.

22. Apparatus according to claim 21 wherein a smooth transition section is positioned between and connects said shaft section and said flange section of said composite shaft member and further wherein said external support member extends from the periphery of said flange section inwardly across said transition section so as to provide bearing support to both said flange section and said transition section.

23. Apparatus according to claim 16 wherein said intermediate layers extend flat across said support member wherein either said inner layer or said outer layer is formed to the shape of the support member 24. Apparatus according to claim 11 wherein the intermediate layer of said inner and outer pluralities closest said sandwich layer are oriented in the same direction with respect to the shaft axis to minimize torsional shear in the sandwich layer.

25. A composite shaft member having an integral end flange with the shaft section, the flange section and the transition section therebetween concentric about an axis and including a plurality of layers of material positioned concentrically within one another and extending the full length of the shaft portion and the flange portion and being bonded together to form the shaft and flange and including:
  a. an inner layer of parallel high modulus fibers,
  b. an outer layer of parallel high modulus fibers,
  c. a plurality of intermediate layers of high modulus fibers positioned concentrically between said inner and outer layers and bonded thereto and to each other and each including a plurality of high modulus fibers extending in parallel relationship to one another and forming a selected angle with the shaft axis and wherein the fibers of adjacent intermediate layers are oriented in different selected angular relationship with respect to the shaft axis,
  d. and high bearing strength support means cooperating with the periphery of the flange section to add bearing strength thereto.

26. Apparatus according to claim 25 wherein said high modulus fibers are boron filaments.

27. Apparatus according to claim 25 wherein said support means is at least one circumferentially extending ring embedded in the periphery of said flange section.

28. Apparatus according to claim 27 wherein said circumferentially extending ring is metal.

29. Apparatus according to claim 25 wherein the fibers of a first of said intermediate layers forms a 45° angle with the shaft axis and wherein the fibers of a second of said intermediate layers forms a 45° angle with the shaft axis and a 90° angle with the fibers of the first intermediate layer.

30. Apparatus according to claim 25 and including a high bearing strength support member abutting the periphery of said flange section in parallel relationship to said high bearing strength support means.

31. Apparatus according to claim 30 wherein a smooth transition section is positioned between and connects said shaft section and said flange section of said composite shaft member and further wherein said external support member extends from the periphery of said flange section inwardly across said transition section so as to provide bearing support to both said flange section and said transition section.

32. Apparatus according to claim 25 wherein each of said layers includes a plurality of finger members at the flange end thereof which flare out to effect a smooth transition between the shaft section and the flange section.

33. Apparatus according to claim 25 wherein said bearing strength support means includes at least one thin-walled cup member embedded in the flange section and having a substantially flat outer portion extending through the flange section and having an outer periphery corresponding to that of the flange section and curving asymptotically with respect to the shaft axis through the transition section and into the shaft portion and being shaped so that its inner periphery includes a plurality of fingers which taper both in circumferential dimension and in wall thickness.

34. Apparatus according to claim 33 including a plurality of said cup members forming alternate layers with said intermediate layers of high modulus fibers and shaped and oriented so that the fingers of each cup member terminates in a plane perpendicular to the shaft axis and in axially spaced relation to the plane of termination of the fingers of all other cup members and, further, wherein the finger members of adjacent cup members are out of circumferential alignment.

35. A one-piece, composite shaft with at least one integral end flange and with a smooth transition section extending between the shaft section and the flange section and formed of a plurality of bonded layers positioned concentrically about the shaft axis and each extending throughout the shaft and flange and cooperating to form a sandwiched construction wall including:
  a. an inner plurality of layers having:
    1. an inner layer of parallel high modulus fibers,
    2. an outer layer of parallel high modulus fibers,
    3. a plurality of intermediate layers of high modulus fibers positioned between said inner and outer layers and bonded thereto and each other and each having a series of parallel high modulus fibers selectively oriented with respect to the shaft axis so that the fibers of different intermediate layers extend in different directions,
  b. a sandwich layer of honeycomb material enveloping and bonded to said inner plurality of layers,
  c. an outer plurality of layers enveloping said sandwich layer and including:
    1. an inner layer of parallel high modulus fibers enveloping and bonded to said sandwich layer,
    2. an outer layer of parallel high modulus fibers forming the outer skin,
    3. a plurality of intermediate layers of high modulus fibers positioned between said inner and outer layers and bonded thereto and to each other and each having a series of parallel high modulus fibers selectively oriented with respect to the shaft axis so that the fibers of different intermediate layers extend in different directions.
    4. and high bearing strength support means cooperating with the periphery of the flange section to add bearing strength thereto.

36. Apparatus according to claim 35 wherein said intermediate layers of said inner and outer pluralities are oriented at an angle of about 45° with the shaft axis.

37. Apparatus according to claim 35 wherein said high modulus fibers of said intermediate layer pluralities are boron filaments.

38. Apparatus according to claim 35 wherein said sandwich layer is made of plastic foam.

39. Apparatus according to claim 35 wherein said shaft is asymmetric and wherein said outer plurality of layers includes a greater number of intermediate layers than the inner plurality of layers.

40. Apparatus according to claim 35 wherein each of said layers includes a plurality of finger members adjacent the end flange which flare out smoothly through said transition section and said flange section.

41. Apparatus according to claim 35 wherein the intermediate layer of said inner and outer pluralities closest said sandwich layer are oriented in the same direction with respect to the shaft axis to minimize torsional shear in the sandwich layer.

42. Apparatus according to claim 35 wherein said bearing strength support means includes at least one thin-walled cup member embedded in the flange section and having a substantially flat outer portion extending through the flange section and having an outer periphery corresponding to that of the flange section and curving asymptotically with respect to the shaft axis through the transition section and into the shaft portion and being shaped so that its inner periphery includes a plurality of fingers which taper both in circumferential dimension and in wall thickness.

43. Apparatus according to claim 42 including a plurality of said cup members forming alternate layers with said intermediate layers of high modulus fibers and shaped and oriented so that the finger of each cup member terminates in a plane perpendicular to the shaft axis and in axially spaced relation to the plane of termination of the fingers of all other cup members and, further, wherein the finger members of adjacent cup members are out of circumferential alignment.

44. Apparatus according to claim 35 and including a layer of small apertured material positioned between and bonded to said outer layer of said inner plurality of layers and said sandwiched layer and also between said inner layer of said outer plurality of layers and said sandwiched layer.

45. A composite shaft member having integral end flanges with both the shaft section, flange sections and the transition sections therebetween concentric about an axis and including a plurality of layers of material positioned concentrically within one another and extending the full length of the shaft portion, the transition sections and the flange portions and being bonded together to form the shaft and flanges and including:
　a. an inner layer of parallel high modulus fibers,
　b. an outer layer of parallel high modulus fibers,
　c. a plurality of intermediate layers of parallel high modulus fibers positioned concentrically between said inner and outer layers and bonded thereto and to each other wherein the parallel layers of each of said layers are selectively oriented with respect to said axis and extend the full length of said shaft section, said transition sections and said flanges sections.

46. Apparatus according to claim 45 wherein the fibers of at least one of said layers forms about a 45° angle with the shaft axis and wherein the fibers of a second of said layers forms about a 45° angle with the shaft axis and a 90° angle with the fibers of the first layer.

47. Apparatus according to claim 45 wherein each of said layers includes a plurality of finger members at the flange ends thereof which flare out to effect a smooth transition between the shaft section and the flange section.

48. Apparatus according to claim 45 and including high bearing strength support means cooperating with the flange sections to add bearing strength thereto.

49. A one-piece, composite shaft with at least one integral end flange and with a smooth transition section extending between the shaft section and the flange section and formed of a plurality of bonded layers positioned concentrically about the shaft axis and each extending throughout the shaft and flange and cooperating to form a sandwiched construction wall including:
　a. an inner plurality of layers having:
　　1. an inner layer of parallel high modulus fibers
　　2. an outer layer of parallel high modulus fibers
　　3. a plurality of intermediate layers of high modulus fibers positioned between said inner and outer layers and bonded thereto and each other and each having a series of parallel high modulus fibers selectively oriented with respect to the shaft axis so that the fibers of different intermediate layers extend in different directions,
　b. a sandwich layer of honeycomb material enveloping and bonded to said inner plurality of layers, wherein the parallel layers of each of said layers of said inner plurality extend the full length of said shaft section, said transition section, and said flange,
　c. an outer plurality of layers enveloping said sandwich layer and including:
　　1. an inner layer of parallel high modulus fibers enveloping and bonded to said sandwich layer,
　　2. an outer layer of parallel high modulus fibers forming the outer skin,
　　3. a plurality of intermediate layers of high modulus fibers positioned between said inner and outer layers and bonded thereto and to each other and each having a series of parallel high modulus fibers selectively oriented with respect to the shaft axis so that the fibers of different intermediate layers extend in different directions, wherein the parallel layers of each of said layers of said outer plurality extend the full length of said shaft section, said transition section and said flange.

50. Apparatus according to claim 49 wherein said intermediate layers of said inner and outer pluralities are oriented at an angle of about 45° with the shaft axis.

51. Apparatus according to claim 49 wherein said high modulus fibers of said intermediate layer pluralities are boron filaments.

52. Apparatus according to claim 49 and including high bearing strength support means cooperating with the flange section to add bearing strength thereto.

53. Apparatus according to claim 49 within the layer of said inner and outer pluralities closest said sandwich layer are oriented in the same direction with respect to the shaft axis to minimize torsional shear in the sandwich layer.

* * * * *